(12) United States Patent
Appukuttan et al.

(10) Patent No.: US 9,945,247 B2
(45) Date of Patent: Apr. 17, 2018

(54) GAS TURBINE ENGINE ANTI-ICING SYSTEM

(71) Applicant: ROLLS-ROYCE PLC, London (GB)

(72) Inventors: Ajith Appukuttan, Leicester (GB); Benjamin Keeler, Chesterfield (GB); Paolo Vanacore, Derby (GB)

(73) Assignee: ROLLS-ROYCE plc, London (GB)

( * ) Notice: Subject to any disclaimer, the term of this patent is extended or adjusted under 35 U.S.C. 154(b) by 272 days.

(21) Appl. No.: 14/813,755

(22) Filed: Jul. 30, 2015

(65) Prior Publication Data

US 2016/0061056 A1    Mar. 3, 2016

(30) Foreign Application Priority Data

Aug. 26, 2014   (GB) .................................. 1415078.3

(51) Int. Cl.

| F01D 25/02 | (2006.01) |
|---|---|
| F01D 9/02 | (2006.01) |
| F01D 15/08 | (2006.01) |
| F01D 17/10 | (2006.01) |
| F01D 25/10 | (2006.01) |
| F02C 7/141 | (2006.01) |

(Continued)

(52) U.S. Cl.
CPC ............... *F01D 25/02* (2013.01); *F01D 9/02* (2013.01); *F01D 15/08* (2013.01); *F01D 17/105* (2013.01); *F01D 25/10* (2013.01); *F02C 7/047* (2013.01); *F02C 7/141* (2013.01); *F02K 3/115* (2013.01); *B64D 2013/0607* (2013.01); *F05D 2220/32* (2013.01); *F05D 2240/10* (2013.01); *F05D 2260/208* (2013.01); *Y02T 50/675* (2013.01)

(58) Field of Classification Search
CPC .... F01D 25/02; F02C 7/047; F05D 2260/205; F05D 2260/213
See application file for complete search history.

(56) References Cited

U.S. PATENT DOCUMENTS

B535,928 I5    1/1976  Shah
3,981,466 A    9/1976  Shah
(Continued)

FOREIGN PATENT DOCUMENTS

EP    0743435 A1    11/1996
GB       697093 A  *  9/1953  .............. F02C 7/047
(Continued)

OTHER PUBLICATIONS

Jan. 20, 2016 Search Report issued in European Patent Application No. 15178821.

(Continued)

*Primary Examiner* — Richard Edgar
*Assistant Examiner* — John S Hunter
(74) *Attorney, Agent, or Firm* — Oliff PLC

(57) ABSTRACT

An anti-icing system for an engine section stator of a gas turbine engine. The system includes an environmental control system pre-cooler heat exchange system and a conduit. The environmental control system pre-cooler heat exchange system is configured to exchange heat between air bled from a compressor of the engine and bypass duct air. The conduit is configured to exchange heat from the pre-cooler heat exchange system to a heat transfer medium. The conduit is also configured to transfer the heat from the heat transfer medium to the engine section stator.

12 Claims, 5 Drawing Sheets

(51) Int. Cl.
    *F02K 3/115*     (2006.01)
    *F02C 7/047*     (2006.01)
    *B64D 13/06*     (2006.01)

(56) References Cited

U.S. PATENT DOCUMENTS

| | | |
|---|---|---|
| 4,782,658 A | 11/1988 | Perry |
| 5,423,174 A | 6/1995 | Mouton |
| 9,387,923 B2 * | 7/2016 | Stretton .................. F02C 3/067 |
| 2006/0042223 A1 | 3/2006 | Walker et al. |
| 2009/0049836 A1 | 2/2009 | Erickson et al. |
| 2010/0236215 A1 | 9/2010 | Venkataramani et al. |
| 2011/0131999 A1 | 6/2011 | Gao et al. |
| 2013/0175001 A1 | 7/2013 | Cheong |
| 2014/0017067 A1 * | 1/2014 | Stretton .................. F02C 3/067 |
| | | 415/116 |

FOREIGN PATENT DOCUMENTS

| | | |
|---|---|---|
| JP | 2005-248764 A | 9/2005 |
| WO | 0238938 A1 | 5/2002 |
| WO | 2014/135942 A1 | 9/2014 |

OTHER PUBLICATIONS

Feb. 27, 2015 Search Report issued in British Patent Application No. GB1415078.3.

* cited by examiner

GAS TURBINE ENGINE ANTI-ICING SYSTEM

FIELD OF THE INVENTION

The present invention relates to an anti-icing system for removing and/or preventing the buildup of ice in a gas turbine engine.

BACKGROUND TO THE INVENTION

FIG. 1 shows a high-bypass gas turbine engine 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. The accelerated air then passes through a plurality of Outlet Guide Vanes (OGVs) 31. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 27, 28, 30. The working fluid, which has reduced in pressure and temperature, is then expelled through the exhaust nozzle 25 and generates the remaining portion of the engine 10 thrust. Respective low, intermediate and high pressure shafts 27, 28, 30 couple the fan 12 to the low pressure turbine 24, the intermediate pressure compressor 14 to the intermediate pressure turbine 22 and high pressure compressor 16 to the high pressure turbine 20 respectively.

The compressors 14, 16 comprise alternating rotors and stators, which compress the air in use. The intermediate compressor 14 comprises a first stator 32 provided at an inlet to the core, rear of the intake fan 12. This first stator is termed the "Engine Section Stator" (ESS) or "core inlet stator". The ESS is prone to ice buildup in use due to the low temperatures sometimes experienced during engine operation, particularly at the leading edge. Such ice can reduce the aerodynamic performance of the ESS, and/or cause damage to downstream components such as rotors of the compressors 14, 16 where large pieces of ice breakoff. Consequently, aircraft gas turbine engines generally include anti-icing systems for the ESS 32 to prevent ice build-up, and to melt any ice that accumulates.

In a first known system, electrical heaters located within the ESS 32 are used to heat the ESS 32. The electrical power for this system must be obtained from generators (not shown) driven by the gas turbine itself. This results in additional electrical load on the engine generators, and hence increased fuel burn, as the engine must be operated at higher powers to provide sufficient torque to power the generators.

In a second known system, engine bleed air is used to provide ESS de-icing. FIG. 2 shows such a system. Bleed air is taken from the intermediate compressor 14 into a duct 34, and fed through the ESS 32, before being vented overboard. However, use of this compressed air is not thermodynamically efficient, since the compressed air is not utilised in the thermodynamic cycle of the engine 10. Furthermore, large pipes are required to deliver this air to the ESS. These pipes carry hot, high pressure air, and so must be relatively heavy to accommodate this. The hot air also presents a fire risk should a leak occur. Consequently, while this method may provide adequate de-icing, it also increases the weight, complexity and cost of the engine, while reducing fuel efficiency.

The present disclosure describes an ESS anti-icing arrangement which seeks to overcome some or all of the above problems.

SUMMARY OF THE INVENTION

According to a first aspect of the present invention there is provided a gas turbine engine comprising an anti-icing system for an engine section stator of the gas turbine engine, the system comprising:
an environmental control system pre-cooler heat exchange system configured to reject heat from air bled from a compressor of the engine to bypass duct air;
the heat exchange system being further configured to transfer the rejected heat to a further heat transfer medium, the system being configured to transfer heat from the heat transfer medium to the engine section stator.

Advantageously, the heated bypass duct air from the environmental control system pre-cooler is used to provide heat to a further heat transfer medium, which is used to provide anti-icing air for the ESS. It has been surprisingly found that the heat rejected from the compressor bleed air to the bypass duct air during different stages of the aircraft flight cycle substantially matches the heat required to de-ice the ESS, and consequently, such an arrangement provides sufficient energy for ESS anti-icing under substantially all operating conditions. Consequently, the rejected heat from the pre-cooler can be used in ESS anti-icing, thereby increasing the thermodynamic efficiency of the engine.

The pre-cooler heat exchange system may comprise a heat exchanger configured to transfer heat from the air bled from the compressor to bypass duct air and to the further heat transfer medium.

The pre-cooler heat exchange system may comprise a first heat exchanger configured to transfer heat from the air bled from the compressor to bypass duct air, and a second heat exchanger configured to transfer heat from the bypass duct air heated by the first heat exchanger to the further heat transfer medium.

The gas turbine engine may comprise a multi-spool gas turbine engine. In a first example, the gas turbine engine comprises a two-spool gas turbine engine having a high pressure compressor and a low pressure compressor, and the compressor bleed air may be provided from one or both of the high pressure compressor and the low pressure compressor. In a second example, the gas turbine engine comprises a three-spool gas turbine engine having a high pressure compressor, an intermediate pressure compressor, and a fan, and the compressor bleed air may be provided from one or both of the high pressure compressor and the intermediate pressure compressor. The heat transfer medium may comprise a heat transfer fluid, and the system may comprise a conduit configured to circulate the heat transfer fluid between the further heat exchanger and the ESS. The system may comprise a pump configured to circulate the heat transfer fluid within the conduit.

Alternatively, the conduit may comprise a heat pipe.

The conduit may further be configured to transfer the heat within the heat transfer medium to a fan root of the gas turbine engine. Where the heat transfer medium comprises heat transfer fluid such as engine oil, the conduit may be located within the fan root downstream of the ESS.

The conduit may be arranged such that the heat transfer medium circulates around a closed circuit between the further heat exchanger and the engine section stator.

DETAILED DESCRIPTION

Figure 1:
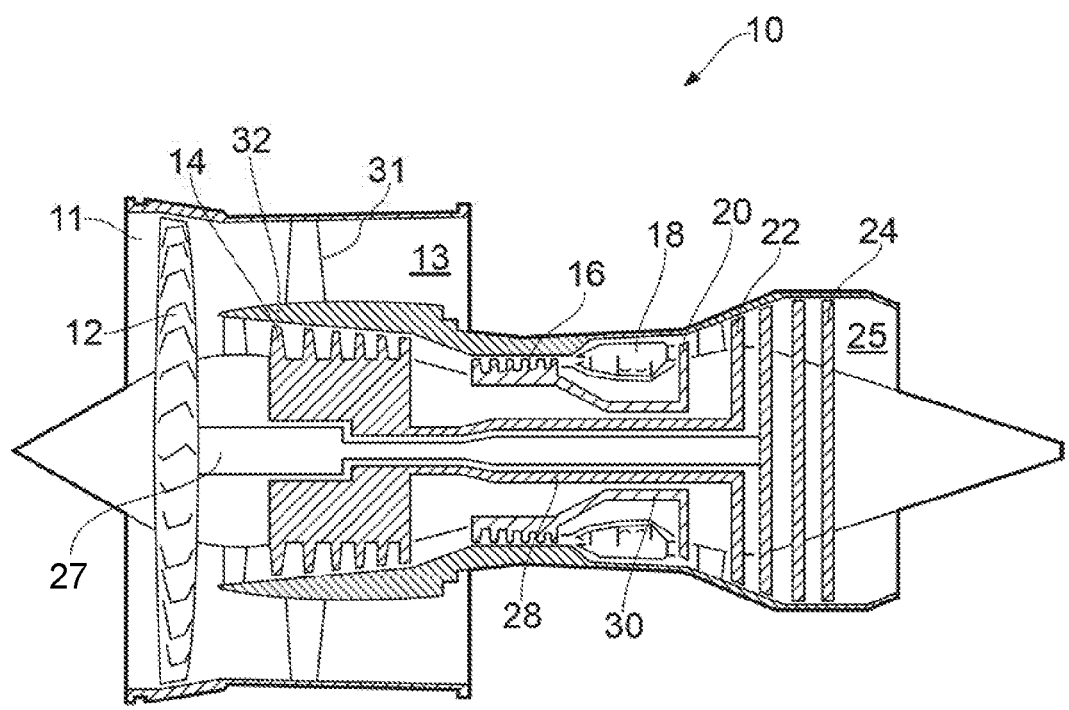
FIG. 1 shows a schematic cross sectional view of a gas turbine engine.
Figure 2:
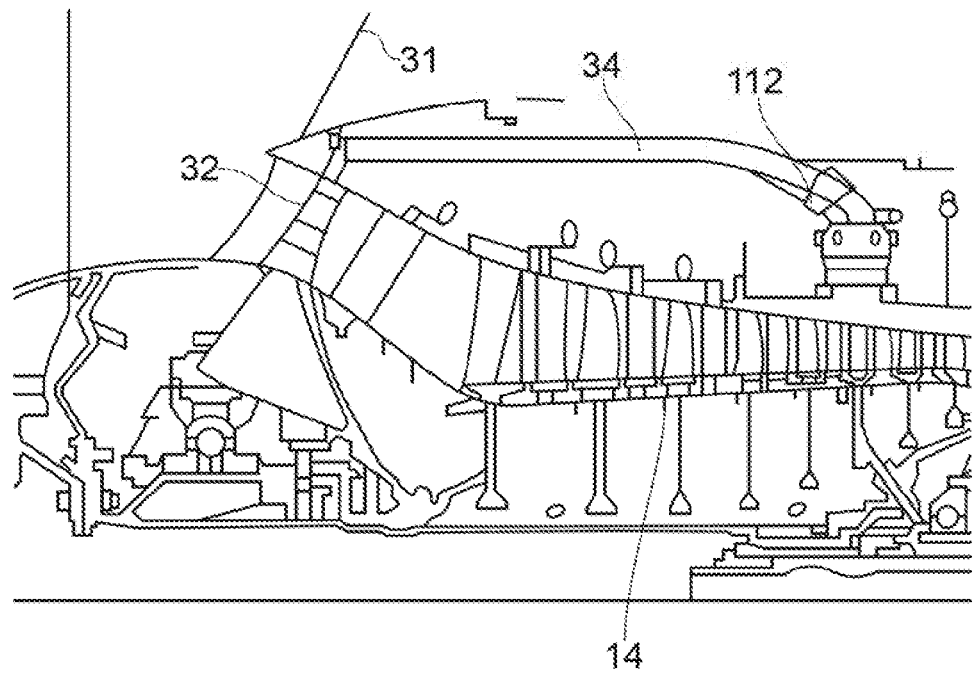
FIG. 2 shows part of the gas turbine engine of FIG. 1 showing a prior anti-icing system.
Figure 3:
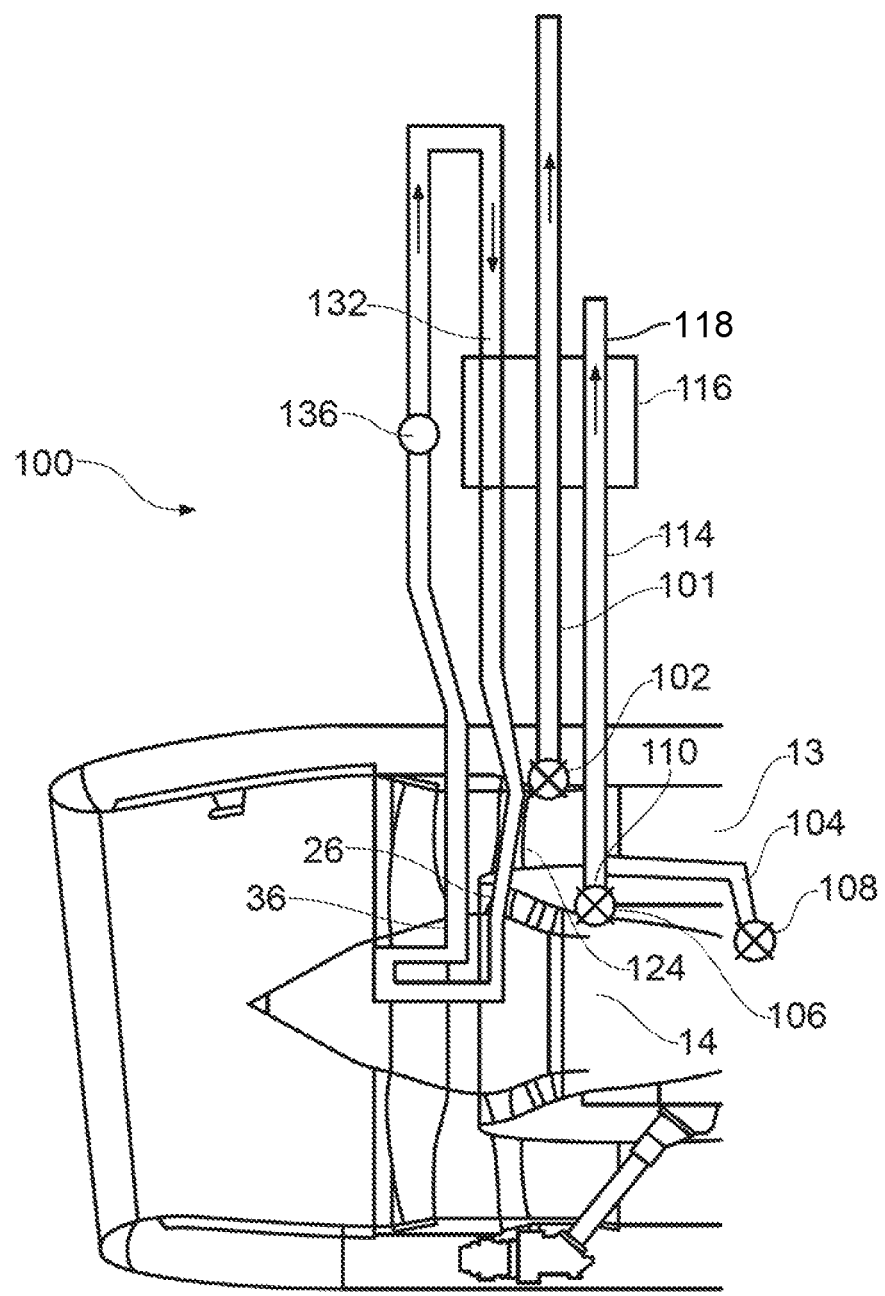
FIG. 3 shows a schematic cross sectional view of a first anti-icing system in accordance with the present disclosure.

FIG. 3 shows a first anti-icing system 100 for use with a gas turbine engine such as engine 10 shown in FIG. 1. The system is shown schematically, and does not represent actual sizes and positions of components.

The system 100 comprises a bypass air passage 101 which is configured to receive cool air at slightly above ambient pressure from the bypass duct 13. The passage 101 includes a flow valve 102 at an inlet thereof, which regulates mass flow through the passage 101 in use in accordance with signals received from a controller such as FADEC (not shown).

High pressure and intermediate pressure compressor bleed passages 104, 106 are also provided, which provide high pressure air from the high pressure and intermediate pressure compressors 14, 16 respectively of engine 10. Valves 108, 110 are provided, to regulate mass flow through the respective passages 104, 106. Again, these valves 108, 110 are controlled by FADEC. Air from the high and intermediate pressure bleed passages 104, 106 is mixed in a manifold 112. An outlet of the manifold 112 leads to a mixed bleed passage 114, through which mixed bleed air from the compressors 14, 16 flows in use. Further compressor bleeds may also be provided, such as handling bleeds.

A cabin bleed pre-cooler 116 heat exchange system is provided in the form of a cabin air pre-cooler heat exchanger 116. Air from the mixed bleed passage 114 is in thermal contact with air from the bypass air duct passage 101 within the pre-cooler 116. Consequently, the cabin bleed pre-cooler 116 is arranged to cool high temperature mixed bleed air from the mixed bleed air passage 114, by transferring heat to the bypass duct air in the bypass duct air passage 101. Cooled mixed compressor air from a first outlet 118 of the pre-cooler 116 is sent to an environmental control system (not shown), which provides air conditioned, pressurised air for the cabin of the aircraft.

The bypass duct air passage 101 also extends through the heat exchanger 116. Warmed bypass air within the pre-cooler 116 is used to heat a heat transfer fluid such as oil which runs through a conduit 132 through the heat exchanger 116. The conduit 132 and bypass air passage 101 are arranged in cross flow, such that a portion of the heat from the bypass flow within passage 101 is transferred to the oil within the conduit 132 via the heat exchanger 116. Consequently, a large proportion of the heat rejected from the compressor air to the bypass is transferred to the oil.

Figure 5:
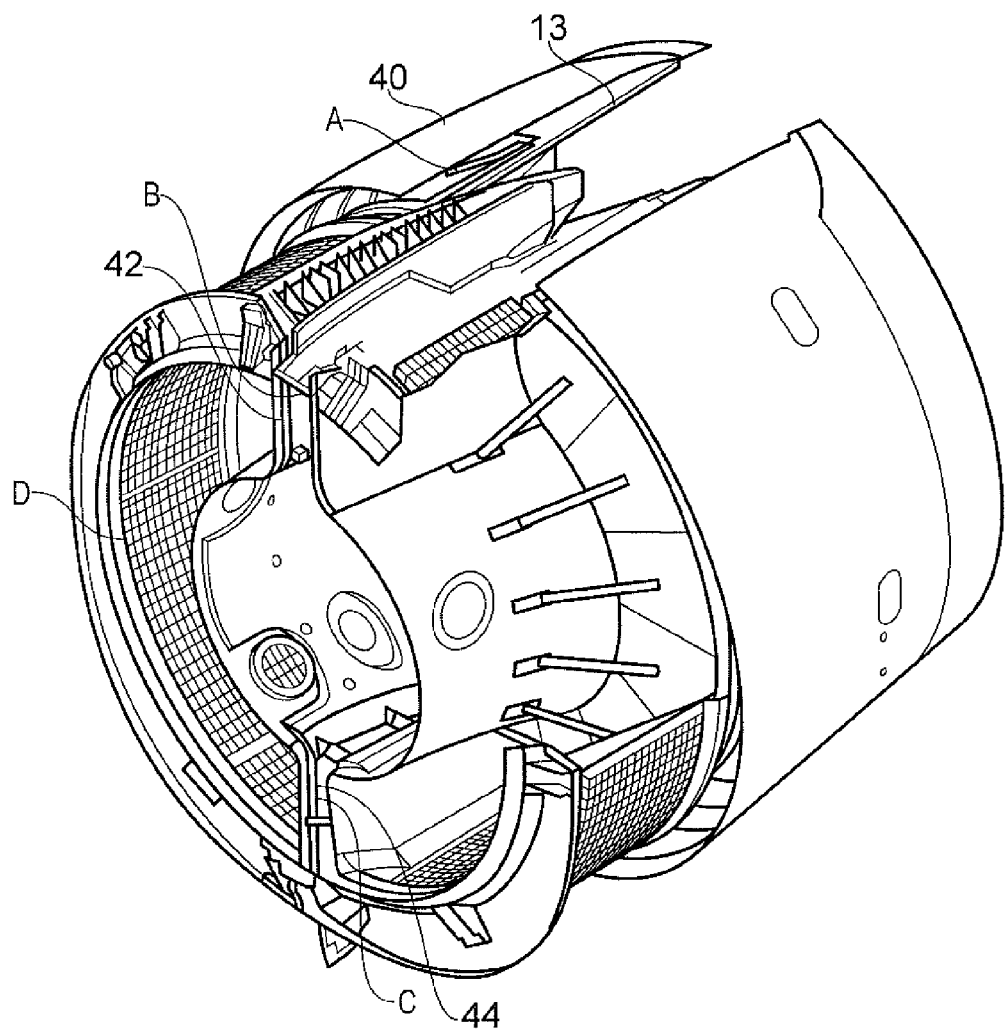
FIG. 5 shows a perspective view from a rear of part of an anti-icing system in accordance with the present disclosure, showing alternative locations for the pre-cooler heat exchange system.

The conduit 132 extends through an outlet guide vane (OGV) 124 of the engine 10, though the conduit could extend through other parts of the engine such as the splitter fairing (see FIG. 5). From here, the conduit 132 extends through into each of the plurality of engine section stators (ESS) 26 via a manifold. The conduit 132 is in thermal contact with the walls of each ESS 26, such that a portion of the heat from the heat transfer medium is transferred to the walls of each ESS 26, thereby heating each ESS 26, and preventing ice from accumulating on the external surface of the ESS 26.

The conduit 132 extends along the length of each ESS into an internal passageway within an engine fan root 36 (also known as the front bearing housing). Again, the conduit 132 is in thermal contact with the walls of the fan root 36, thereby transferring a portion of the remaining heat of the transfer fluid to the fan root 36, which again thereby prevents ice from accumulating thereon.

The conduit 132 extends from the fan root 36, back through an ESS 26 to the heat exchanger 116, thereby completing a fluid circuit. A pump 136 is provided in order to drive the heat exchanger fluid through the conduit 132 in the direction shown.

Consequently, rejected heat from the pre-cooler 116 is used to prevent ice buildup within at least the ESS 26, and optionally, also the fan root 30. Advantageously, the invention obviates the need for hot, high pressure air to be directed through the ESS 26, which may prevent a fire hazard, or complicate fire zoning within the engine 10. The system may also reduce weight, and would also increase the thermal efficiency of the engine, as waste heat from the pre-cooler 116 is utilised, instead of dedicated compressor air.

Figure 4:
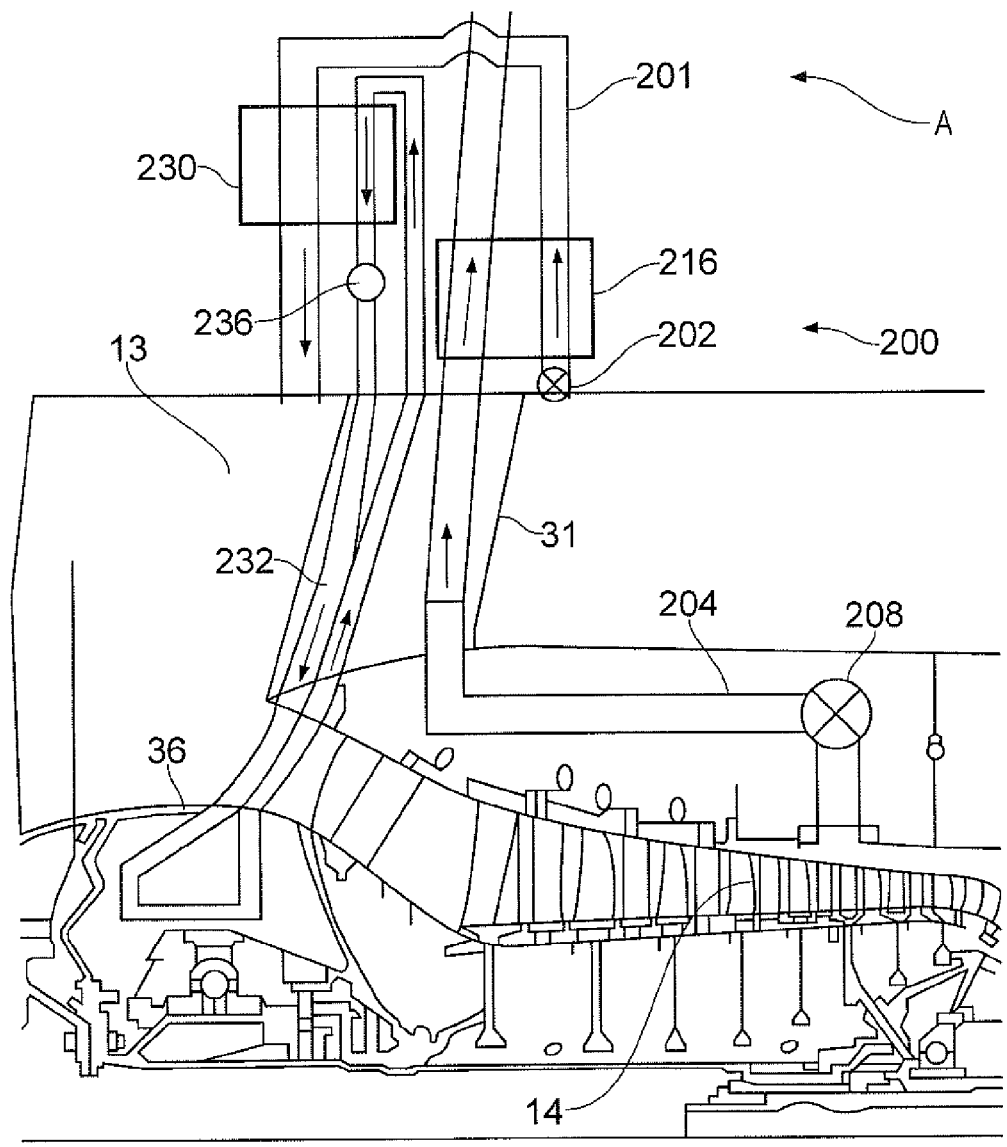
FIG. 4 shows a schematic cross sectional view of a second anti-icing system in accordance with the present disclosure.

FIG. 4 shows an alternative anti-icing system 200. The anti-icing system 200 also comprises a bypass air passage 101 configured to receive air from the bypass duct 13 controlled by a valve 202.

The system 200 includes a single compressor bleed passage 204, which communicates with a $6^{th}$ stage of the intermediate pressure compressor 14 via a valve 208. A pre-cooler heat exchange system is provided, which comprises a first heat exchanger in the form of a cabin air pre-cooler heat exchanger 216, and a second heat exchanger in the form of an ESS anti-icing heat exchanger 230.

The bypass passage 201 and compressor bleed passage 204 extend through the first heat exchanger 216, and are in thermal contact such that some of the heat of the compressor bleed air is transferred to the bypass air within the bypass passage 201.

The bypass passage 201 extends downstream of the first heat exchanger 216 into the second heat exchanger 230. Within the second heat exchanger 230, heat from the bypass air within the bypass passage 201 is transferred to a heat exchanger fluid in the form of oil located within a conduit 232 which passes therethrough in heat exchange relationship with the bypass air. Consequently, the oil within the conduit 232 is heated by the bypass air, which is in turn heat by compressor air via the cabin air pre-cooler 216. Once cooled by the oil, the bypass air is returned to the bypass duct 13.

The conduit 232 extends into the ESS 26 and fan root 36 thereby warming these locations, before returning to the heat exchanger 230 in a similar manner to the system 100. The oil is driven around the circuit by a pump 236.

The system 200 is located within an annular space A between the bypass duct 13 and fan cowl doors (a location known in the art as "zone 1"). Further locations for the systems 100, 200 are shown in FIG. 5.

FIG. 5 shows a rear perspective view of part of the engine 10, showing potential locations for the heat exchanger 116. A first possible location could be an annular space A between the bypass duct 13 and fan cowl doors 40 (known in the art as zone 1), which form the outer surface of the engine nacelle. A second possible location could be within internal spaces B, C defined by upper or lower splitter fairings 42, 44 (also known as bifurcations), which supports the engine core. A third possible location could be the interior D of the fan bypass duct 13.

This invention has been found to be possible in view of the insight that the heat rejected by the pre-cooler 116 during various stages of the engine cycle exceeds or closely matches the heat required for ESS anti-icing.

Figure 6:
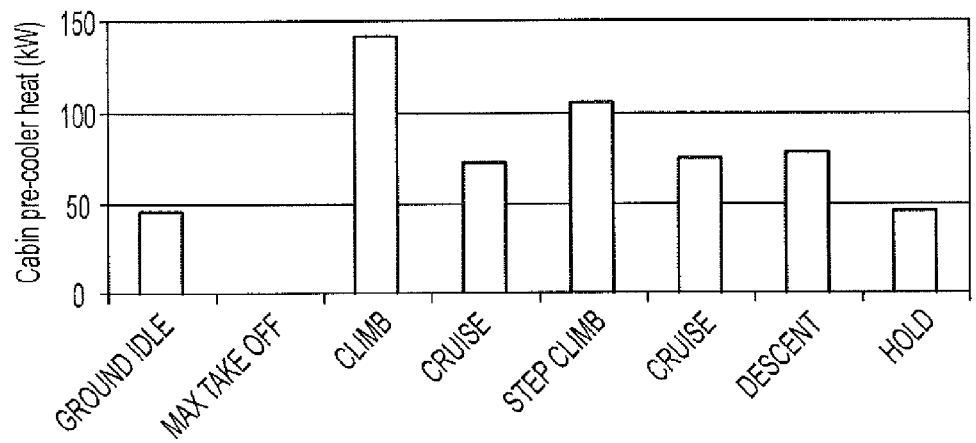
FIG. 6 shows a graph of heat rejected to the bypass duct air at different stages of a flight cycle.
Figure 7:
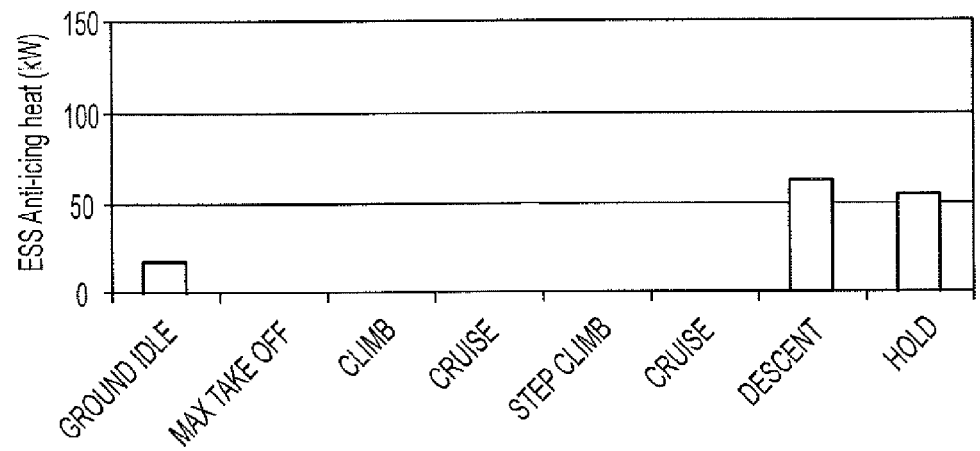
FIG. 7 shows a graph of heat rejected to the bypass duct air at different stages of a flight cycle to heat required for ESS anti-icing.

FIG. 6 shows the heat rejected by the pre-cooler 116 in kW during various stages of the flight cycle for a typical existing gas turbine engine 10. FIG. 7 shows maximum heat required for ESS anti-icing during those stages of the flight cycle in icing conditions. As can be seen, the heat rejected by the pre-cooler 116 generally matches or exceeds the heat required for ESS anti-icing, with the possible exception of the hold condition. Consequently, an auxiliary heating system (such as an electrical heating system) may be provided for providing additional heat during such conditions.

Alternatively, the required heat could be reduced using anti-icing coatings on the ESS 26, or by redesigning the ESS 26.

By transferring heat to the heat exchange medium from the compressor bleed air via the cabin bleed air pre-cooler heat exchange system, engine oil can be used as the heat exchange medium, without exposing the engine oil to excessively high temperatures, which might result in coking. The system also utilises waste heat that would normally be rejected from the engine, without substantially affecting the temperature of compressor air downstream of the cabin pre-cooler, which must be kept within certain temperature and pressure bounds so that it can be used by the ECS system.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

For example, the conduit could comprise a heat pipe, in which the heat transfer medium is a mixture of liquid and vapour phases of a heat transfer fluid. In some cases, the return line and pump could be omitted, as the heat transfer medium can be transferred between the ESS and further heat exchanger by gravity and/or capillary action. The conduit could run through the bifurcation. Heat could be transferred to a ESS from the heat transfer medium via a further heat transfer medium.

Although the pre-cooler heat exchanger and further heat exchanger are shown in the described embodiment as comprising separate apparatus, the functions of these heat exchangers could be combined in a single physical apparatus.

The invention claimed is:

1. A gas turbine engine comprising an anti-icing system for a compressor stator of the gas turbine engine, the anti-icing system comprising:
   an environmental control pre-cooler heat exchange system configured to:
      exchange heat between air bled from a compressor of the gas turbine engine and bypass duct air, and
      exchange heat from the bypass air heated by the air bled from the compressor to a heat transfer medium located within a conduit, the conduit extending from the environmental control system pre-cooler heat exchange system to the compressor stator and being configured to transfer heat from the heat transfer medium to the compressor stator,
   wherein the conduit extends through an outlet guide vane for a bypass duct of the gas turbine engine.

2. The gas turbine engine according to claim 1, wherein the environmental control pre-cooler heat exchange system comprises a heat exchanger configured to transfer heat from the air bled from the compressor to the bypass duct air and to the further heat transfer medium.

3. The gas turbine engine according to claim 1, wherein the environmental control pre-cooler heat exchange system comprises a first heat exchanger configured to transfer heat from the air bled from the compressor to the bypass duct air, and a second heat exchanger configured to transfer heat from the bypass duct air heated by the first heat exchanger to the further heat transfer medium.

4. The gas turbine engine according to claim 1, wherein the gas turbine engine comprises a multi-spool gas turbine engine.

5. The gas turbine engine according to claim 1, wherein the heat transfer medium comprises a heat transfer fluid, and the anti-icing system is configured to circulate the heat transfer fluid between the environmental control pre-cooler heat exchange system and the compressor stator.

6. The gas turbine engine according to claim 5, wherein the anti-icing system comprises a pump configured to circulate the heat transfer fluid within the conduit, wherein the heat transfer fluid is configured to flow in a closed loop.

7. The gas turbine engine according to claim 5, wherein the conduit comprises a heat pipe.

8. The gas turbine engine according to claim 1, wherein the anti-icing system is configured to further transfer the heat within the heat transfer medium to a fan root of the gas turbine engine.

9. The gas turbine engine according to claim 8, wherein the conduit extends into the fan root to transfer the heat within the heat transfer medium to the fan root.

10. The gas turbine engine according to claim 1, further comprising:
   a bypass passage for the bypass air, the bypass passage extending from the bypass duct and through the environmental control pre-cooler heat exchange system; and
   a bleed passage for the air bled from the compressor, the bleed passage extending from the compressor to the environmental control pre-cooler heat exchange system, wherein
   the environmental control pre-cooler heat exchange system is configured to exchange heat from the bleed passage to the bypass passage and to exchange heat from the bypass passage to the conduit.

11. The gas turbine engine according to claim 10, wherein the conduit extends through the compressor stator and into a fan root of the gas turbine engine, the anti-icing system being configured to further transfer heat to the fan root.

12. The gas turbine engine according to claim 10, wherein the environmental control pre-cooler heat exchange system further comprises a first heat exchanger and a second heat exchanger, wherein the bleed passage and the bypass passage exchange heat in the first heat exchanger and the bypass passage and the conduit exchange heat in the second heat exchanger.

* * * * *